(12) United States Patent
Kadiri et al.

(10) Patent No.: US 9,787,146 B2
(45) Date of Patent: Oct. 10, 2017

(54) ROTOR OF ROTARY ELECTRICAL MACHINE WITH INTERPOLAR STRUCTURES

(75) Inventors: Mostafa Kadiri, Le Touquet (FR); Stéphane Desenclos, Tubersent (FR)

(73) Assignee: Valeo Equipements Electriques Moteur (FR)

( * ) Notice: Subject to any disclaimer, the term of this patent is extended or adjusted under 35 U.S.C. 154(b) by 891 days.

(21) Appl. No.: 13/640,380

(22) PCT Filed: Mar. 18, 2011

(86) PCT No.: PCT/FR2011/050562
§ 371 (c)(1),
(2), (4) Date: Dec. 11, 2012

(87) PCT Pub. No.: WO2011/131871
PCT Pub. Date: Oct. 27, 2011

(65) Prior Publication Data
US 2013/0069471 A1    Mar. 21, 2013

(30) Foreign Application Priority Data
Apr. 23, 2010 (FR) ................................. 10 53098

(51) Int. Cl.
*H02K 1/02* (2006.01)
*H02K 1/27* (2006.01)
(Continued)

(52) U.S. Cl.
CPC ............. *H02K 1/243* (2013.01); *H02K 1/02* (2013.01); *H02K 1/223* (2013.01); *H02K 1/226* (2013.01);
(Continued)

(58) Field of Classification Search
CPC .. H02K 1/00; H02K 3/46; H02K 7/04; H02K 16/02; H02K 21/00; H02K 21/02; H02K 21/12; H02K 25/00; H02K 2201/06; H02K 2205/00; H02K 2213/00; H02K 2213/12; H02K 29/03; H02K 21/22; H02K 1/2786; H02K 3/00; H02K 16/00; H02K 2201/00; H02K 1/226; H02K 1/243; H02K 3/325; H02K 3/528; H02K 15/022; H02K 21/044; H02K 21/048; H02K 1/223; H02K 1/27; H02K 1/02; H02P 25/00; H02P 25/02
USPC ......... 310/10, 40 R, 91, 192, 152, 262, 263, 310/154.33, 156.01, 156.07, 156.19, 310/156.23, 156.41, 156.44, 156.66, 310/156.69, 156.71, 156.73, 261.1, 310/156.43, 261, 156
See application file for complete search history.

(56) References Cited

U.S. PATENT DOCUMENTS 2,089,626 A * 8/1937 Smith .......................... 417/369
5,483,116 A * 1/1996 Kusase et al. ............... 310/263
(Continued)

FOREIGN PATENT DOCUMENTS

FR            2932325         12/2009
FR    WO 2010000996 A2 *  1/2010 ........... H02K 21/044

*Primary Examiner* — Bernard Rojas
*Assistant Examiner* — Alexander Singh
(74) *Attorney, Agent, or Firm* — Berenato & White, LLC

(57) ABSTRACT

A rotary electrical machine rotor having claw-shaped poles. The machine comprising a plurality of interpolar magnetic assemblies having at least two magnetic assemblies comprising different magnet grades.

9 Claims, 5 Drawing Sheets

(51) Int. Cl.
*H02K 1/24* (2006.01)
*H02K 3/52* (2006.01)
*H02K 1/22* (2006.01)
*H02K 3/32* (2006.01)
*H02K 21/04* (2006.01)
*H02K 15/02* (2006.01)

(52) U.S. Cl.
CPC ............... *H02K 1/27* (2013.01); *H02K 3/325* (2013.01); *H02K 3/528* (2013.01); *H02K 21/044* (2013.01); *H02K 15/022* (2013.01)

(56) References Cited

U.S. PATENT DOCUMENTS

| | | | |
|---|---|---|---|
| 5,543,676 A * | 8/1996 | York et al. .................. | 310/263 |
| 5,945,760 A * | 8/1999 | Honda et al. ............ | 310/156.53 |
| 5,973,435 A * | 10/1999 | Irie et al. .................. | 310/263 |
| 6,144,138 A * | 11/2000 | Ragaly ...................... | 310/263 |
| 6,333,582 B1 * | 12/2001 | Asao et al. ................ | 310/263 |
| 6,847,143 B1 * | 1/2005 | Akemakou ............ | 310/156.43 |
| 7,259,489 B2 * | 8/2007 | Utsumi et al. ........... | 310/156.72 |
| 7,560,851 B2 * | 7/2009 | Inoue et al. ............... | 310/263 |
| 7,569,968 B2 * | 8/2009 | Nakamura ................ | 310/263 |
| 8,754,561 B2 * | 6/2014 | Masfaraud ........... | H02K 21/044 |
| | | | 310/156.66 |
| 2004/0251759 A1* | 12/2004 | Hirzel ......................... | 310/114 |
| 2004/0251761 A1* | 12/2004 | Hirzel ...................... | 310/156.25 |
| 2009/0115361 A1* | 5/2009 | Nitta ........................ | 318/400.09 |
| 2010/0013339 A1* | 1/2010 | Badey .................. | H02K 15/022 |
| | | | 310/156.66 |

* cited by examiner

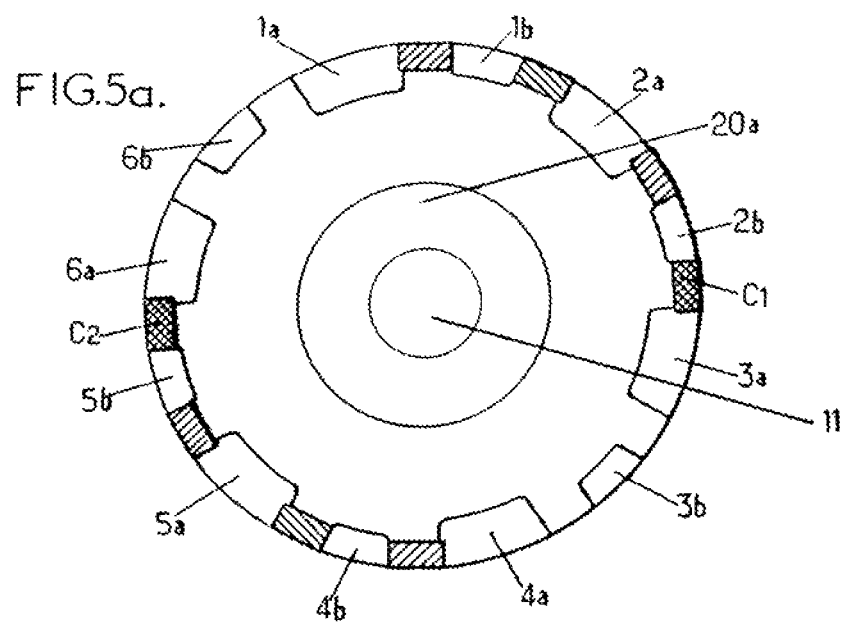
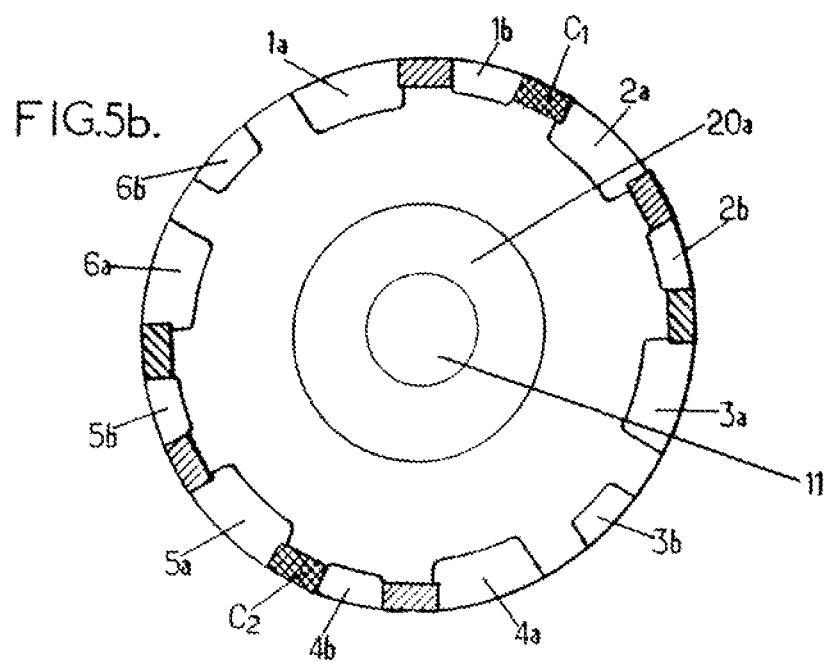

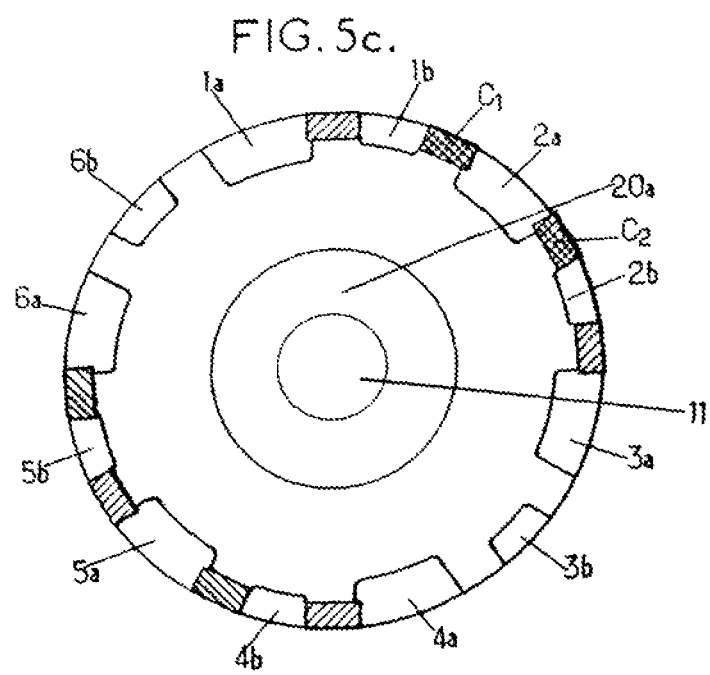
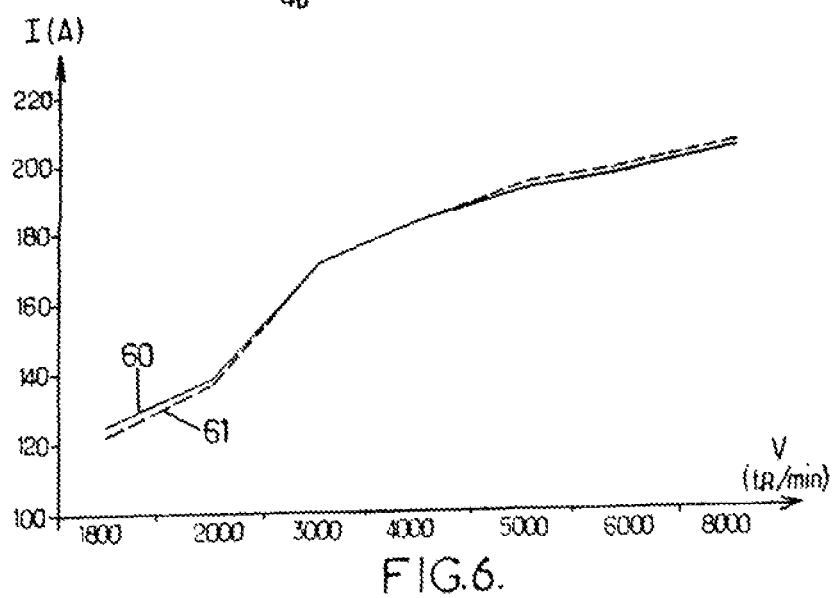

ROTOR OF ROTARY ELECTRICAL MACHINE WITH INTERPOLAR STRUCTURES

CROSS-REFERENCE TO RELATED APPLICATIONS AND CLAIM TO PRIORITY

This application is a national stage application of International Application No. PCT/FR2011/050562 filed Mar. 18, 2011, which claims priority to French Patent Application No. 10/53098 filed Apr. 23, 2010, of which the disclosures are incorporated herein by reference and to which priority is claimed.

The present invention relates in general to rotary electrical machines.

More particularly the invention relates to rotary electrical machines of the alternator or alternator-starter type, which are designed for motor vehicles.

Still more particularly, the invention relates to rotary electrical machines, the rotor of which comprises one or a plurality of excitation coils, magnetic poles, and permanent magnets which are arranged between the magnetic poles. Because of this arrangement these magnets are known as interpolar magnets.

Typically, the rotor has a structure with claws. A structure of this type is constituted by two opposite, imbricated magnet wheels, each comprising claws. Each claw of a magnet wheel extends in the direction of the other magnet wheel. In addition, each claw is inserted between two consecutive claws of the opposite magnet wheel. In addition, the rotor comprises magnetic parts, and the excitation coil is wound around the rotation shaft of the machine.

The rotor is arranged inside a stator. When the rotary machine is operating, the rotor rotates around its axis, and a magnetic flow circulates between the adjacent magnetic poles, with respective opposite polarities, by passing via the windings of the stator. The magnets which are arranged between the magnetic poles, and are constituted by claws, are used to prevent the magnetic flow from passing directly from one pole to the other without passing via the stator.

In fact, this leakage of flow from one pole to the other without passing via the stator affects the output, and detracts from the power performance of the rotary electrical machine. In fact, the flow which passes directly from one claw to the other without passing via the stator does not participate in the operation of the machine. The use of interpolar magnets makes it possible to limit these leakages.

Interpolar magnets with a globally parallelepiped form are known. Each of them is placed between two adjacent claws of the rotor, each claw belonging respectively to one of the two magnet wheels. These interpolar magnets are retained either by means of hooks or by two grooves (or shoulders) each of which is provided in one of the opposite lateral edges of the claws between which the magnet is situated.

In applications in which the rotary electrical machine must provide a large amount of power, the use of a large number of these magnets is indispensable.

Because of the cost of the raw material from which they are made, for example rare earths or ferrite, these interpolar magnets represent a substantial part of the cost of the rotor.

These are limited amounts of the main sources of raw material used for these magnets, and their exploitation is controlled. The raw material is therefore subject to financial speculation which has made its price level spiral.

In addition, since the presence of the magnets can disrupt the mechanical balance of the rotary electrical machine relative to its axis of rotation, their use is not widespread, since this makes the mechanical balancing of the rotor problematic, which complicates the process. The weight of the ferrites is twice that of the rare earths.

The object of the present invention is to improve the situation by optimising the design of the rotary electrical machines in order to reduce the costs which are associated with the use of the magnets in the rotors of these machines.

For this purpose, according to a first aspect of the invention, a rotor of a rotary electrical machine is proposed which has an axis around which it can be rotated, and around which rotor a stator can be provided. This rotor comprises two magnet wheels, each of which has a series of polar claws which extend according to an axial direction. These claws have a cross-section on a plane perpendicular to the axis which is substantially trapezoidal, and extend from an outer radial end of the magnet wheel, in the direction of the other magnet wheel. The magnet wheels are arranged such that each claw of a magnet wheel is situated between two consecutive polar claws of the other magnet wheel. Magnetic assemblies are provided in at least part of the interpolar spaces. Each magnetic assembly comprises at least one magnet. At least two magnetic assemblies have respective grades of magnet which differ from one another.

Thus, it is possible to design rotors of electrical machines which are optimised from the electrical and cost point of view. In fact, it is possible to reach a close approximation of a target of, for example, electrical current intensity supplied (in terms of electric power supplied, or the like), whilst limiting the cost of the magnets to be used for this purpose. For example, magnetic assemblies according to a first grade of magnet, which is efficient and therefore costly, are used to reach a close approximation of the target, then, to complete and achieve the target the rotor is completed with magnetic assemblies according to a second grade of magnet which is less costly.

For example, at least two magnetic assemblies are constituted by two different grades of magnet which are selected from amongst at least ferrite materials, rare earth materials, and Alnico materials (aluminium, nickel, cobalt).

Also for example, each magnetic assembly comprises a single magnet.

According to certain embodiments, at least a first group of magnetic assemblies comprising at least two magnetic assemblies of the same grade has angular positions which are substantially equally distributed in the interpolar spaces.

Thus, despite the presence of magnetic assemblies with different grades and densities, the rotor continues to be mechanically balanced in its movement of rotation.

For example, at least two magnetic assemblies with the same grade of magnet are arranged in positions which are substantially symmetrical relative to the axis of rotation of the rotor on a transverse plane which is perpendicular to the axis of rotation of the rotor.

According to other embodiments, magnetic assemblies of at least a second group comprising at least two magnetic assemblies with the same grade have positions which are substantially not equally distributed in the interpolar spaces, and comprise a means for mechanical balancing of the rotor relative to the axis of rotation of the rotor, which means is designed to compensate for the imbalance generated by the distribution of the magnetic assemblies.

For example, the balancing means comprises at least one from amongst a bore in the rotor or material which is added onto the rotor.

According to a second and third aspect of the invention, an alternator and an alternator-starter comprising a rotor according to the first aspect are provided.

The invention will be better understood by reading the following description, provided purely by way of example, with reference to the attached drawings, in which:

FIGS. 3, 4, 5a, 5b and 5c are views according to a radial cross-sectional plane rotor according to certain embodiments;

FIG. 6 is a graph illustrating the performance of a rotor according to one embodiment, and a rotor according to the prior art.

A rotor according to an embodiment of the invention is described with reference to FIG. 1. This rotor comprises at least one axis of symmetry X. This axis corresponds to the axis of rotation of the rotor. In the present description, "axial direction" and "radial direction" thus denote directions such as indicated respectively by the arrows "A" and "R" in FIG. 1.

Figure 1:
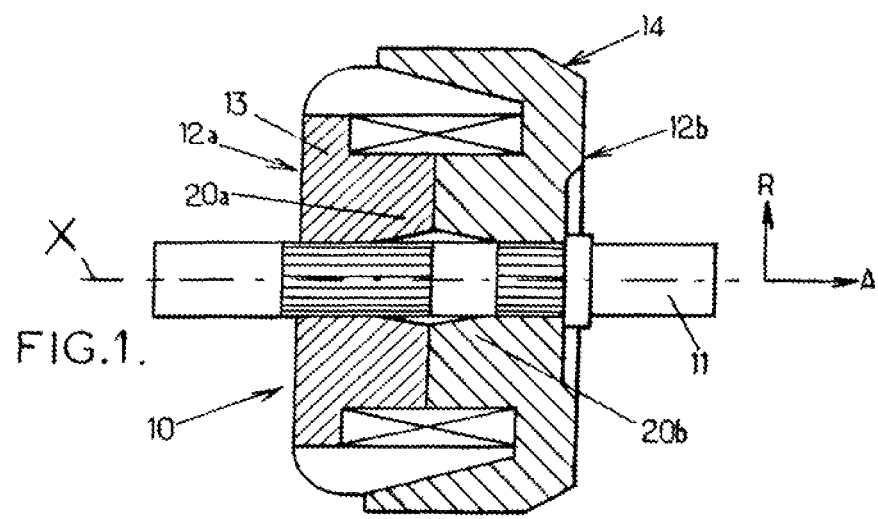
FIG. 1 is a view according to a plane in longitudinal cross-section of a rotor according to one embodiment.

The rotor 10 in FIG. 1 can be used in a rotary electrical machine such as an alternator of a polyphase type, for a motor vehicle with a thermal engine. The alternator can be reversible, and can operate as an alternator starter with an alternator mode and an electric motor mode, in particular in order to start the thermal engine of the vehicle.

The rotor 10 is integral in rotation with a central shaft 11, known as the rotor shaft. In an installation in a rotary electrical machine, the rotor is arranged in a stator (not represented) which surrounds the rotor. The rotor 10 is produced in the form of a rotor with claws comprising two magnet wheels 12a, 12b, which in this case are axially juxtaposed. Each wheel has a transverse flange 13 with an annular form. This transverse flange is provided on its outer periphery with polar claws 14 which extend substantially axially. The two magnet wheels are coupled by their respective core 20a and 20b. The core 20a (or 20b) has a substantially cylindrical form and extends from the transverse flange 13 of the wheel 12a (or 12b), according to the direction of the axis of the rotor, towards the other magnet wheel 12b (or 12a).

An annular gap exists between the outer peripheral surface of the polar claws 14 and the inner periphery of the body of the stator. It corresponds to the radial distance between an outer end of the polar claws and an inner end of the stator.

The claws 14 have a transverse cross-section, i.e. on a cross-sectional plane perpendicular to the axis of the rotor which has a globally trapezoidal or triangular form. The claws of each of the magnet wheels 12a, 12b face axially towards the flange 13 of the other magnet wheel 12a, 12b, in addition, the claw 14 of one magnet wheel 12a, 12b penetrates into the space which exists between two adjacent claws 14 of the other magnet wheel 12a, 12b. Thus, the claws 14 of the magnet wheels 12a, 12b are imbricated.

Figure 2:
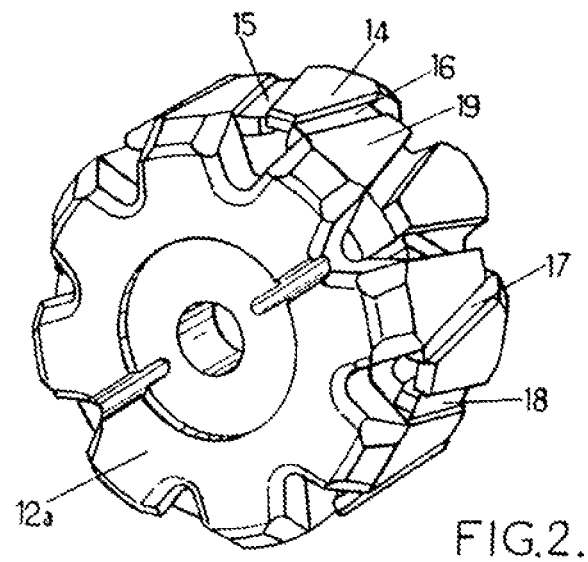
FIG. 2 is a view in perspective of a rotor according to one embodiment.

FIG. 2 shows magnetic assemblies 15, 16, 17, 18 which are arranged between two imbricated claws, each belonging to a magnet wheel, so that each of interpolar spaces, defined between the imbricated polar claws of the magnet wheels 12a, 12b, receives only one of the magnetic assemblies 15, 16, 17, 18. In the embodiment in FIG. 2, each magnet wheel comprises eight claws. Equally well, in other embodiments, it is possible to provide a different number of claws, such as, for example, six claws. Insertion of these magnetic assemblies can be carried out according to techniques known to persons skilled in the art, such as axial grooves (or shoulders) on the lateral surfaces of the claws. For example, the magnetic assembly 16 is inserted in the grooves (or shoulders) which are provided respectively in the claws 14 and 19 of the rotor, such that the magnetic assembly is in contact both with the claw 14 of the magnet wheel 12b and with the imbricated claw 19 of the other magnet wheel 12a.

FIGS. 3, 4, 5a, 5b and 5c illustrate a plurality of arrangements of the magnetic assemblies in a rotor with two magnet wheels, each of which has for example six claws. These FIGS. 3, 4, 5a, 5b and 5c are transverse cross-sections of the rotor, which represent in cross-section:

the core 20a;

the claws 1a, 2a, 3a, 4a, 5a and 6a of the wheel 12a to which the cores 20a belongs; and the claws 1b, 2b, 3b, 4b, 5b and 6b of the opposite wheel 12b.

The claws of the wheel 12a are shown with a cross-section which is larger than the cross-section shown for the claws of the wheel 12b, since the cross-section according to which the rotor is represented is a cross-section in the magnet wheel 12a, and because the claws have a trapezoidal form.

In FIGS. 3, 4, 5a, 5b and 5c, the magnetic assemblies which are inserted between the claws consist of a single magnet so that each of interpolar spaces receives only one of the magnetic assemblies. It is possible to provide magnetic assemblies comprising other elements, such as, for example, a fine metal plate for retention of the magnet, retention hooks or the like.

Figures 3, 4:
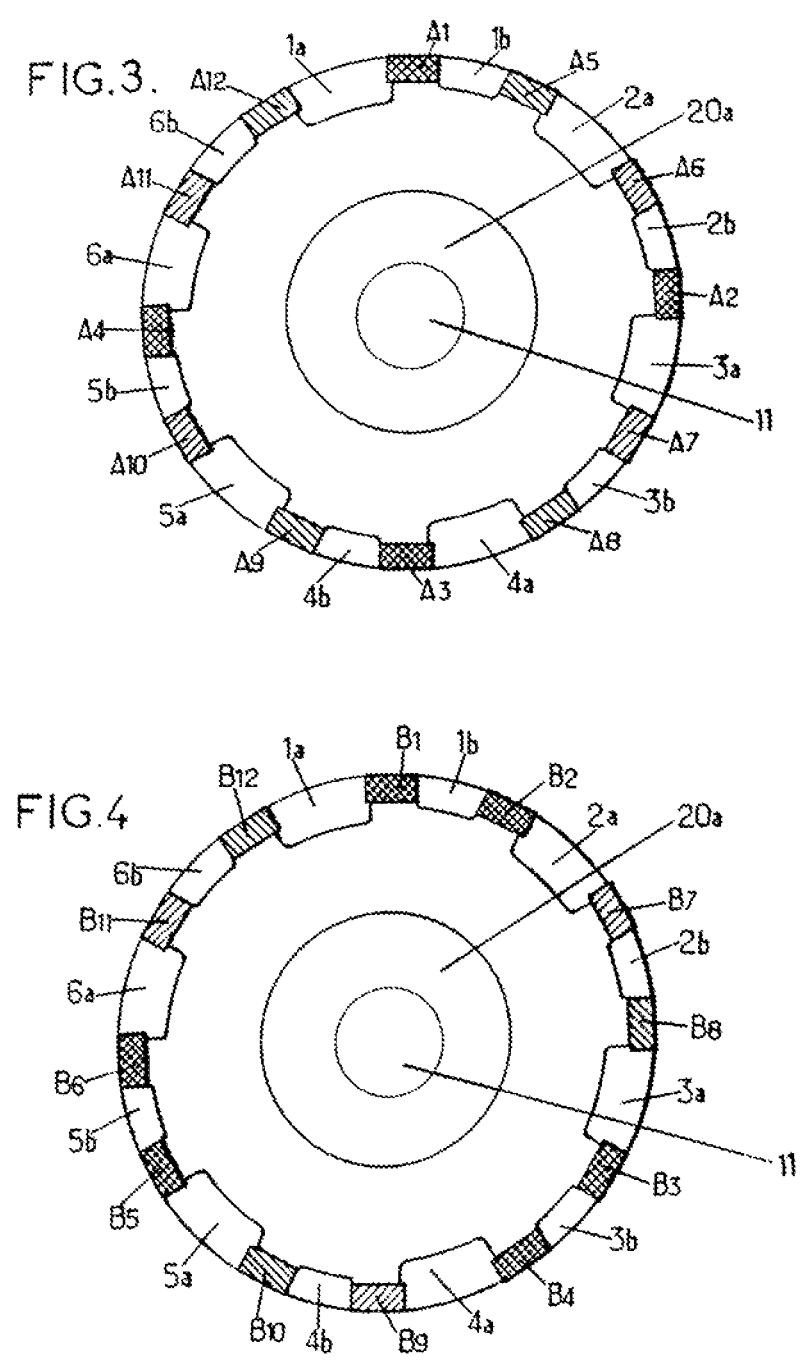

In FIG. 3, four ferrite magnets A1, A2, A3 and A4 are arranged respectively between the claws 1a and 1b, 2b and 3a, 4a and 4b, 5b and 6a. In addition, eight rare earth magnets A5, A6, A7, A8, A9, A10, A11 and A12 are arranged respectively between the claws 1b and 2a, 2a and 2b, 3a and 3b, 3b and 4a, 4b and 5a, 5a and 5b, 6a and 6b, 6b and 1a. In other words, the ferrite magnets A1-A4 and the the rare earth magnets A5-A12 are disposed in different interpolar spaces. For example, one magnetic assembly including the rare earth magnet A5, A6, A7, A8, A9, A10, A11 or A12 has a first magnet grade and another magnetic assembly including the ferrite magnet A1, A2, A3 or A4 has a second magnet grade being different from the first magnet grade.

The magnets with the same grade are arranged in pairs on both sides of the axis of the rotor. In addition the magnets with the same grade have positions which are regularly distributed (equally distributed) around the circumference of the rotor.

In FIG. 4, six ferrite magnets B1, B2, B3, B4, B5 and B6 are arranged respectively between the claws 1a and 1b, 1b and 2a, 3a and 3b, 3b and 4a, 5a and 5b, 5b and 6a. In addition, six rare earth magnets B7, B8, B9, B10, B11 and B12 are arranged respectively between the claws 2a and 2b, 2b and 3a, 1a and 4b, 4b and 5a, 6a and 6b, 6b and 1a.

In the configuration in FIG. 4, the magnets with the same grade are not arranged in pairs on both sides of the rotor axis. However, the groups of magnets with the same grade have positions which are regularly distributed (equally distributed) around the circumference of the rotor.

In the configurations in FIGS. 3 and 4, good distribution of weight of the magnetic assemblies is retained, with the result that the movement of rotation of the rotor around its axis is not disrupted.

The interpolar spaces need not all be filled, such as, for example, in the configuration in FIG. 5a. In this configuration, two ferrite magnets C1 and C2 are arranged respectively between the claws 2b and 3a, and 5b and 6a. Six rare earth magnets are arranged respectively between the claws 1a and 1b, 1b and 2a, 2a and 2b, 4a and 4b, 4b and 5a, 5a and 5b. No magnet is arranged between the claws 3a and 3b, 3b and 4a, 6a and 6b, 6b and 1a.

Despite the non-regular distribution of the magnets around, the rotor, it is possible to maintain good performance levels.

In order to illustrate these performance levels, table 1 below makes it possible to compare, for different speeds of rotation of the rotor:

firstly the intensity of the current supplied by a rotor according to the prior art, with two magnet wheels, each of which has six claws and eight rare earth interpolar magnets; and secondly the intensity of the current supplied by a rotor having the same number of claws, as well as six rare earth interpolar magnets and two ferrite interpolar magnets, the magnets being arranged according to three configurations known as A, B and C.

The configuration A corresponds to the arrangement of the magnets illustrated by FIG. 5a.

The configuration B, illustrated by FIG. 5b, is a variant of the configuration A and corresponds to:

the arrangement of the two ferrite magnets C1 and C2 respectively between the claws 1b and 2a, and 5a and 4b;

the lack of a magnet between the claws 3a and 3b, 3b and 4a, 6a and 6b, 6b and 1a; and the arrangement of rare earth magnets in the other interpolar spaces.

The configuration C, illustrated by FIG. 5c, is another variant of the configuration A and corresponds to:

the arrangement of the two ferrite magnets C1 and C2 respectively between the claws 1b and 2a, and 2a and 2b;

the lack of a magnet between the claws 3a and 3b, 3b and 4a, 6a and 6b, 6b and 1a; and the arrangement of rare earth magnets in the other interpolar spaces.

TABLE 1

| | Current supplied (A) | | | |
|---|---|---|---|---|
| Speed (rpm) | rotor according to the prior art (A) | rotor according to arrangement A | rotor according to arrangement B | rotor according to arrangement C |
| 1800 | 125 | 121.7 | 122.9 | 122.1 |
| 2000 | 138 | 136.5 | 137.5 | 137 |
| 3000 | 171 | 171.1 | 171.6 | 171.9 |
| 4000 | 183.2 | 183.2 | 183.4 | 184 |
| 5000 | 192.3 | 193.2 | 193.3 | 193.7 |
| 6000 | 196.8 | 198.4 | 198.7 | 198.3 |
| 8000 | 203.4 | 204.7 | 205.2 | 205 |

Reading this table makes it possible to determine that on average, the difference in performance is less than 1%. The rotors according to the embodiments described, therefore have performance levels which are equivalent to those of the rotor according to the prior art. The development of the current supplied according to the speed of the rotor is illustrated by the graph in FIG. 6. The curve 60 represents the development of the current supplied by the rotor according to the prior art, and the curve 61 represents the development of the mean of the currents supplied by the rotors according to the configurations A, B and C.

According to one aspect of the invention, the costs of production of the rotors are reduced.

At the time of filing of the present application, a rare earth magnet which is conventionally used as an interpolar magnet costs approximately 0.40 Euros, and a ferrite magnet conventionally used as an interpolar magnet costs approximately 0.09 Euros.

Thus, the cost of the raw material of the interpolar magnets of the rotor according to the prior art is 8×0.40=3.60 Euros, and the cost of the raw material for the rotors according to the embodiments described is 6×0.60+ 2×0.09=2.58 Euros. In this case, the present invention makes possible a saving of 28.3%.

The present invention thus permits very great savings, in particular in the mass production of rotors.

Table 1 also makes it possible to determine that the configuration of the arrangement of the magnets has little influence on the performance of the rotor. Thus, regular distributions of the magnets can be selected in order to obtain good mechanical performance of the rotor. However, for example in order to simplify a method for insertion of the magnets, non-regular distributions can also be selected (such as that in FIG. 5c for example).

In the case of non-regular distribution, it is then possible to provide means for rebalancing of the rotor in order not to detract from its mechanical performance.

Figure 7:
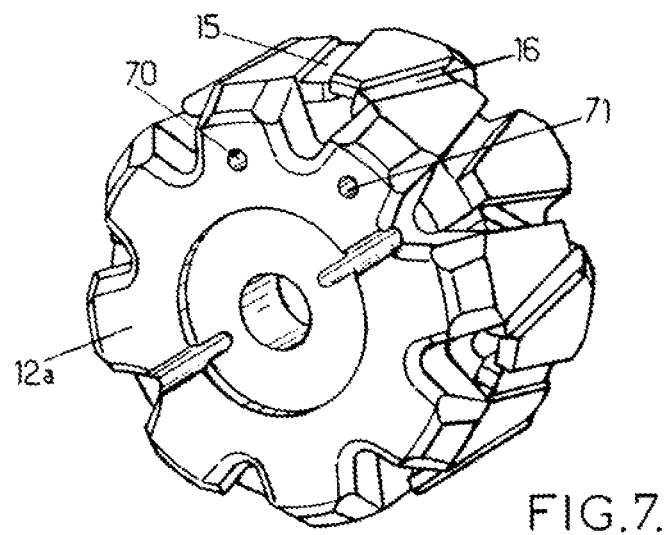
FIGS. 7 and 8 illustrate means for mechanical rebalancing according to certain embodiments.
Figure 8:
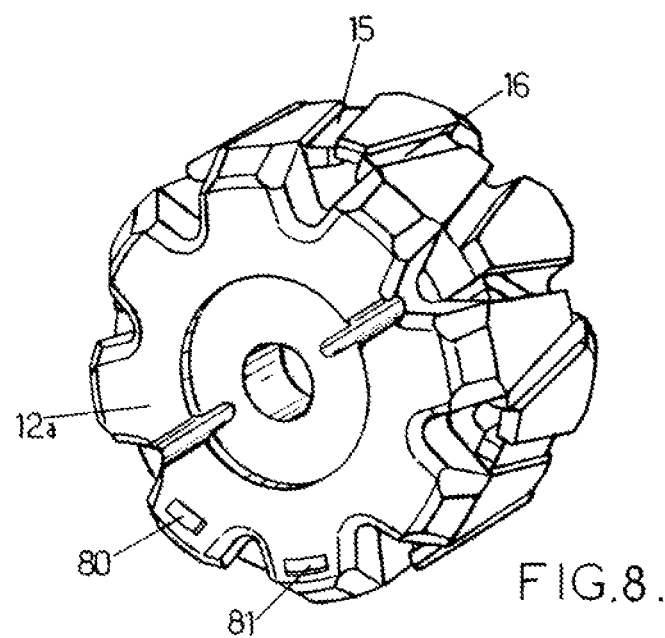

Rebalancing means of this type are illustrated by FIGS. 7 and 8. FIG. 7 illustrates the production of bores 70 and 71 in the flange of the wheel 12a, which comprises for example eight claws at the level of claws which support magnets 15 and 16. Thus, the material bored out compensates for the presence of the weight of the magnets. In different embodiments (not represented), when magnets with different weights are disposed symmetrically relative to the axis of symmetry of the rotor, the bore is provided at the level of the claws which support the heaviest magnets. The bore can also be provided in other parts of the rotor, such as, for example, the claw, or other elements which are not represented. FIG. 8 illustrates the addition of material, for example by welding. Two elements 80 and 81, which for example are made of metal, are welded onto the flange of the wheel 12a in positions which are substantially symmetrical relative to the magnets 15 and 16. In different embodiments, the material can be added at the level of the claws which support magnets with a weight which is lower than that of the magnets which are arranged symmetrically relative to the axis of symmetry of the rotor. Material can be added onto elements of the rotor which are not represented, such as, for example, a fan, in order to compensate for the weight of the magnets 15 and 16.

The present invention has been described and illustrated in the present detailed description and in the figures. The present invention is not limited to the embodiments presented. Other variants, embodiments and combinations of embodiments described can be deduced and implemented by persons skilled in the art by reading the present description and the appended drawings.

Upon reading the present description, persons skilled in the art will understand that numerous embodiments of the invention are possible. It is possible to combine several of the embodiments previously described. In addition, upon reading the present description, persons skilled in the art will be able to deduce other configurations for the distribution of the magnetic assemblies in the interpolar spaces.

In the claims, the term "comprise" does not exclude other elements or other steps. The indefinite article "a" does not exclude the plural. A single processor or several other units can be used in order to implement the invention. The

The invention claimed is:

1. A rotor (10) of a rotary electrical machine, rotatable about an axis, the rotor comprising:
   two magnet wheels (12a, 12b) each having a series of polar claws (14) extending in an axial direction, and having a substantially trapezoidal cross-section on a plane perpendicular to the axis, the polar claws extending from an outer radial end of the magnet wheel (12a) in the direction of the other magnet wheel (12b);
   the magnet wheels being arranged such that each polar claw (14) of one of the magnet wheels is situated in a space existing between two consecutive polar claws of the other magnet wheel; and
   magnetic assemblies (A1, . . . , A12, B1, . . . , B12, C1, C2) are disposed in at least part of interpolar spaces between the imbricated polar claws of the magnet wheels (12a, 12b) so that each of the interpolar spaces receiving only one of the magnetic assemblies, each magnetic assembly comprising at least one magnet;
   at least two magnetic assemblies disposed in two different interpolar spaces have magnet grades different from one another such that one of the at least two magnetic assemblies having a first magnet grade and another of the at least two magnetic assemblies having a second magnet grade different from the first magnet grade;
   each of the magnetic assemblies comprises a single magnet only;
   the single magnet of one of the at least two magnetic assemblies has the first magnet grade and the single magnet of another of the at least two magnetic assemblies having the second magnet grade being different from the first magnet grade.

2. The rotor according to claim 1, wherein at least two magnetic assemblies are constituted by two different magnet grades selected from at least ferrite materials, rare earth materials, and Alnico materials.

3. The rotor according to claim 1, wherein magnetic assemblies of at least one first group of magnetic assemblies (A5-A6, A7-A8, A9-A10, A11-A12), comprising at least two magnetic assemblies of the same grade, have angular positions which are substantially equally distributed in the interpolar spaces.

4. The rotor according to claim 3, wherein magnetic assemblies of at least one second group of magnetic assemblies (B1-B2, B3-B4, B5-B6), comprising at least two magnetic assemblies of the same magnet grade, have positions which are not equally distributed in the interpolar spaces.

5. The rotor according to claim 1, wherein at least two magnetic assemblies with the same grade of magnet (A1-A3, A2, A4) are arranged in angular positions which are substantially symmetrical relative to the axis of rotation of the rotor, on a transverse plane which is perpendicular to the axis of rotation of the rotor.

6. A rotor (10) of a rotary electrical machine, rotatable about an axis, the rotor comprising:
   two magnet wheels (12a, 12b) each having a series of polar claws (14) extending in an axial direction, and having a substantially trapezoidal cross-section on a plane perpendicular to the axis, the polar claws extending from an outer radial end of the magnet wheel (12a) in the direction of the other magnet wheel (12b);
   the magnet wheels being arranged such that each polar claw (14) of one of the magnet wheels is situated in a space existing between two consecutive polar claws of the other magnet wheel; and
   magnetic assemblies (A1, . . . , A12, B1, . . . , B12, C1, C2) are disposed in at least part of interpolar spaces between the imbricated polar claws of the magnet wheels (12a, 12b) so that each of the interpolar spaces receiving only one of the magnetic assemblies, each magnetic assembly comprising at least one magnet; and
   a balancing device for mechanical balancing of the rotor (70, 71, 80, 81) relative to the axis of rotation of the rotor, provided to compensate for the imbalance of the rotor generated by the distribution of the magnetic assemblies;
   at least two magnetic assemblies disposed in two different interpolar spaces have magnet grades different from one another such that one of the at least two magnetic assemblies having a first magnet grade and another of the at least two magnetic assemblies having a second magnet grade different from the first magnet grade;
   the magnetic assemblies including at least one group of magnetic assemblies (B1-B2, B3-B4, B5-B6) comprising at least two magnetic assemblies of the same magnet grade,
   the magnetic assemblies (B1-B2, B3-B4, B5-B6) of the at least one group have positions which are substantially not equally distributed in the interpolar spaces.

7. The rotor according to claim 6, wherein the balancing device comprises at least one of a bore in the rotor or material added onto the rotor.

8. An alternator comprising a rotor rotatable about an axis, the rotor comprising:
   two magnet wheels (12a, 12b) each having a series of polar claws (14) extending in an axial direction, and having a substantially trapezoidal cross-section on a plane perpendicular to the axis, the polar claws extending from an outer radial end of the magnet wheel (12a) in the direction of the other magnet wheel (12b);
   the magnet wheels being arranged such that each polar claw (14) of one of the magnet wheels situated in a space existing between two consecutive polar claws of the other magnet wheel; and
   magnetic assemblies (A1, . . . , A12, B1, . . . , B12, C1, C2) disposed in at least part of interpolar spaces between the imbricated polar claws of the magnet wheels (12a, 12b) so that each of the interpolar spaces receiving only one of the magnetic assemblies, each magnetic assembly comprising at least one magnet;
   at least two magnetic assemblies disposed in two different interpolar spaces have magnet grades different from one another;
   each of the magnetic assemblies comprises a single magnet only;
   the single magnet of one of the at least two magnetic assemblies has a first magnet grade and the single magnet of another of the at least two magnetic assemblies having a second magnet grade being different from the first magnet grade.

9. An alternator-starter comprising a rotor rotatable about an axis, the rotor comprising:
   two magnet wheels (12a, 12b) each having a series of polar claws (14) extending in an axial direction, and having a substantially trapezoidal cross-section on a plane perpendicular to the axis, the polar claws extending from an outer radial end of the magnet wheel (12a) in the direction of the other magnet wheel (12b);

the magnet wheels being arranged such that each polar claw (14) of one of the magnet wheels situated in a space existing between two consecutive polar claws of the other magnet wheel; and magnetic assemblies (A1, . . . , A12, B1, . . . , B12, C1, C2) disposed in at least part of interpolar spaces between the imbricated polar claws of the magnet wheels (12a, 12b) so that each of the interpolar spaces receiving only one of the magnetic assemblies, each magnetic assembly comprising at least one magnet;

at least two magnetic assemblies disposed in two different interpolar spaces have magnet grades different from one another;

each of the magnetic assemblies comprises a single magnet only;

the single magnet of one of the at least two magnetic assemblies has a first magnet grade and the single magnet of another of the at least two magnetic assemblies having a second magnet grade being different from the first magnet grade.

* * * * *